(12) United States Patent
Shawcross

(10) Patent No.: US 6,880,090 B1
(45) Date of Patent: Apr. 12, 2005

(54) METHOD AND SYSTEM FOR PROTECTION OF INTERNET SITES AGAINST DENIAL OF SERVICE ATTACKS THROUGH USE OF AN IP MULTICAST ADDRESS HOPPING TECHNIQUE

(76) Inventor: Charles Byron Alexander Shawcross, 6 Sawgrass Circle, Ashton, Ontario (CA), K0A 1B0

( * ) Notice: Subject to any disclaimer, the term of this patent is extended or adjusted under 35 U.S.C. 154(b) by 0 days.

(21) Appl. No.: 09/551,215

(22) Filed: Apr. 17, 2000

(51) Int. Cl.[7] .............................................. G08F 11/30
(52) U.S. Cl. ..................... 713/201; 713/162; 713/163; 713/200; 713/201; 709/225; 709/229; 709/245
(58) Field of Search ........................................ 713/201

(56) References Cited

U.S. PATENT DOCUMENTS

| | | | | |
|---|---|---|---|---|
| 5,559,883 A | * | 9/1996 | Williams | 713/201 |
| 5,771,349 A | * | 6/1998 | Picazo et al. | 713/202 |
| 5,935,245 A | * | 8/1999 | Sherer | 713/200 |
| 6,018,771 A | * | 1/2000 | Hayden | 709/231 |
| 6,049,878 A | * | 4/2000 | Caronni et al. | 713/201 |
| 6,189,102 B1 | * | 2/2001 | Beser | 713/201 |
| 6,442,617 B1 | * | 8/2002 | Lowe et al. | 709/250 |
| 6,606,706 B1 | * | 8/2003 | Li | 713/162 |

\* cited by examiner

Primary Examiner—Thomas R. Peeso
Assistant Examiner—Syed A. Zia
(74) Attorney, Agent, or Firm—Cassan Maclean

(57) ABSTRACT

The present invention relates to a method and system for Internet Protocol network communications and a use thereof for protecting Internet sites against denial of service attacks on insecure public networks such as the Internet. The method utilizes a multicast address hopping technique which selectively varies the chosen multicast IP address from a set of available multicast addresses according to a predetermined scheme known to the communicating end stations but not to unauthorized end stations. The packets associated with the multicast stream are then communicated on the chosen multicast address. The set of available multicast IP addresses may also be selectively varied according to a secret predetermined scheme known to the transmitter and subscriber end stations, particularly by adding to and dropping from the set of multicast IP addresses in a seemingly random fashion. Using the method of the present invention, potential attackers are prevented from knowing which address to disrupt or monitor for traffic between end stations.

14 Claims, 9 Drawing Sheets

METHOD AND SYSTEM FOR PROTECTION OF INTERNET SITES AGAINST DENIAL OF SERVICE ATTACKS THROUGH USE OF AN IP MULTICAST ADDRESS HOPPING TECHNIQUE

BACKGROUND OF THE INVENTION

1. Field of the Invention

The present invention generally relates to a method and system for Internet Protocol network communications and a use thereof for protecting Internet sites against denial of service attacks on insecure public networks such as the Internet.

2. Background

An ever-increasing trend is the use of the Internet Protocol (IP) based Internet as a communications network for business to consumer (B2C), business to business (B2B), and consumer to consumer (C2C) interaction and transactions. There is a constantly evolving gamut of threats encountered with respect to IP networks, particularly the Internet. Although a network is just the communication channel through which information is accessed or flows, the interconnection of systems worldwide through networks, especially the Internet, has become so widespread that it has become a key component of modern military, industrial, government, and private systems. The growing dependence of the various systems on a properly functioning network increases their operational vulnerability through disruption of the network. The gamut of threats to IP network based systems includes techniques to steal information, corrupt or alter information, destroy information, deny use of services or information, gather indicators of future action, and affect the public's view of various issues, including social, political, and even confidence in a country's government. The Internet, in particular, is an insecure public network and presents various weaknesses that can be exploited by criminals or other elements to disrupt the normal communications between parties on the Internet. Some of these weaknesses include vulnerabilities to various types of Denial of Service (DoS) attacks. Recently, such attacks have successfully disrupted commercial services offered by prominent vendors.

Denial of Service (DoS) can be defined as action(s) which prevent any part of an automated information system (AIS) from functioning in accordance with its intended purpose or intentional degradation or blocking of computer or network resources. The Computer Emergency Response Team (CERT) at Carnegie Mellon University divides Denial of Service into three modes of attack with sub categories. CERT notes that a Denial of Service may only be a component of a larger attack. The three modes are classified under consumption of scarce resources, destruction or alteration of configuration information, and consumption of other resources. This invention particularly relates to the category of Consumption of Scarce Resources, specifically the sub categories of Bandwidth Consumption, Network Connectivity, and Consumption of Other Resources.

Denial of Service (DoS) attacks are often done through the use of scripts also called tools. A few examples of such tools are Capi, Back Orifice 2000 (BO2K), Domain Name System Attack, and Internet Control Message Protocol (ICMP) ECHO which is based on the ping-flooding concept. These tools are freely available for download from the Internet.

Distributed Denial of Service (DDoS) is an enhanced version of a Denial of Service attack where the DoS tools are distributed to multiple hosts, which can then be coordinate to anonymously perform an attack on the target host simultaneously, typically after some time delay. Some of the currently known Distributed Denial of Service Tools are: Trinoo, Tribe Flood Network (TFN) and Tribe Flood Net 2K, and Stacheldraht (meaning "barbed wire" in German).

User of the Internet as a communications medium wish to have immunity from Denial of Service attacks that prevent them from using the Internet as they desire. This is particularly true for businesses offering goods or services for sale to consumers. Disruption of this service can be very costly as certain attacks in early February 2000 against major commercial Internet sites demonstrated. Some estimates range as high as $1.2 Billion loss for the several days of attacks.

A commercial site has to widely advertise its Internet address to any potential customers who use this address to connect to the commercial site to browse for information and make purchases. However attackers can use the advertised address to direct Denial of Service attacks against the site.

Unicast IP Packet Routing and Delivery

Traditional Internet protocol (IP) networks rely mostly on the use of unicast protocol (also known as point to point) packet routing and delivery for communications between end stations (for example, a user and a host site). For unicast, a packet is generated and passed into the network by a first end station having the destination address of the second end station as a parameter. This packet is then routed through the network until it is delivered to the end station computer (or is discarded within the network if it times out or a route to the specified address is not found). The destination end station may or may not have been expecting this packet. For example, a ping packet or connection request packet is typically not expected by its recipient. On the other hand, once a connection-oriented communication like TCP/IP (Transmission Control Protocol) has been initiated between the two stations, then each station is in effect expecting packets from the other station and actively accounts for and sends acknowledgements for these packets.

Unicast Packet Routing and Denial of Service Attacks

The important thing to note is that the unicast delivery of packets is based on a "push" system. Packets can be generated and inserted into the network for delivery to an end station. The end station has little or no control to stop or regulate the flow of certain types of these packets, even if they are causing problems i.e. during an active Denial of Service attack. The "push" protocol forms the weakness that is exploited in many Denial of Service and Distributed Denial of Service attacks occurring on the Internet.

A Denial of Service attack can take the form of a storm of packets addressed to the victim host. This storm of packets can completely clog the communications links into the victim system thus effectively denying service to any legitimate users. The attack can also take the form of using up resources on the target computer such as maximum number of TCP connections. Such an attack can consist of creating multiple TCP connections and then leaving them hanging until they time out. This can use up all the available connection slots thereby denying legitimate users any connections.

Multicast Technology

In contrast to unicast protocol, multicast protocol within an IP network uses a "pull" type system. The destination end station must actively request the reception of these multicast packets by "subscribing" to the router network with special subscription request packets (Internet Group Management Protocol or IGMP) for each multicast address of interest. Once a subscription message is received by a given router from an attached end station the router will autonomously communicate within the network of routing devices to receive the multicast packets with the applicable address. There can be multiple recipients of this traffic flow. If a subscription for a particular address is not renewed periodically by the attached host (typically, in the order of 10's of seconds) then the subscription for that particular address will time out and the router network will no longer route packets for delivery to that particular host. Alternately a host can "de-subscribe" from a given multicast address with a special de-subscribe message to the router which has an immediate impact on the delivery of multicast packets. The important difference between multicast and unicast packet delivery is that under multicast, the end computer station has control over the addresses from which it will accept data.

Under the current version of the Internet Protocol (IP Version 4 or IPv4), the addresses assigned for multicast are known as Class D addresses and range from the 224.0.0.0 to 239.255.255.255. The Internet Assigned Numbers Authority (IANA) maintains a list of registered users and assigns new numbers for new uses. The range from 224.0.0.0 to 224.0.0.25 is reserved for permanent assignment for various applications, including use by routing protocols. The set from 239.0.0.0 to 239.255.255.255 is reserved for various administratively scoped applications; much the same way as the 192.168.0.0 address range is assigned for administratively scoped unicast purposes. Under IPv6, the emerging new IP version, it is anticipated that there will be 112 bits of information to designate a multicast group. This is a much expanded address space over the current IPv4 allocation that only has 28 bits for address space.

Multicast Routing Protocols

Routers in a network or internetwork use multicast routing protocols to efficiently route multicast packets through the network or internetwork much the same as they use unicast (point-to-point) routing protocols to efficiently route unicast packets through the network. The multicast protocols are used to deliver multicast packets from the multicast source to multiple destinations that consist of the members of the multicast group.

Unicast routing protocols use one of two basic techniques, either distance vector (e.g. Routing Information Protocol—RIP), or link state (e.g. Open Shortest Path First—OSPF). Multicast routing protocols can be divided into three categories, distance vector (derived from unicast protocols like RIP), link state (derived from protocols like OSPF), and the newer shared-tree protocols. The multicast protocols in use include: the Distance Vector Multicast Routing Protocol (DVMRP) and Protocol Independent—Dense Mode (PIM-DM) based on distance vector, Multicast Open Shortest Path First (MOSPF) based on link state, and Protocol Independent—Sparse Mode (PIM-SM) and Core-Base Tree (CBT) based on shared trees. Each of these protocols has their strengths and weaknesses and is employed on various parts of the Internet.

Normally, in any Autonomous System (or domain) within the Internet, there is only one multicast protocol used. An Autonomous System is defined as a network administered by one entity and operating under one unicast routing protocol. A protocol used only within an Autonomous System is referred to as an interior gateway protocol (IGP). The administrative authority for a given Autonomous System specifies which unicast and multicast protocol is to be used within the Autonomous System. The decision is based on a number of factors including the type of routing equipment used in the Autonomous System, personnel experience with the various protocols, expected number of users and groups, and dispersion of users. There are protocols in place for routing unicast between autonomous systems, known as exterior gateway protocols (EGP). Autonomous Systems within the Internet are linked together by routers that use these unicast EGP that enforce routing policies. One weakness of multicast is the lack of an EGP for routing multicast between Autonomous Systems. There is work underway to define interdomain routing protocols, notably the Border Gateway Multicast Protocol (BGMP).

Tunneling

An IP packet tunneling technique can be used to tunnel multicast packets from one area of the Internet to another area of the Internet through an area that does not support multicast. In this technique, the multicast packets are received by a router or host on one end of a tunnel, encapsulated in a unicast IP packet and sent by normal IP unicast to the router or host at the other end of the tunnel where the packets are de-encapsulated and sent back out into the network as multicast packets. This technique is effective but requires a significant amount of administrative overhead.

Scoping

Scoping of multicast packets refers to methods of limiting the range to which a multicast packet can travel in a network. There are presently two main methods used for scoping multicast packets, administrative and Time To Live (TTL) scoping. Administrative scoping involves using the multicast addresses on packets in the address space from 239.0.0.0 to 239.255.255.255. Multicast packets in this range do not cross administrative boundaries. Since multicast addresses are assigned locally within the Autonomous System they need not be unique between areas thus allowing for reuse of address space. TTL scoping refers to placing a low value in the TTL field of a packet when it is initially created. Every IP packet has a data field of one byte that defines a time to live for the packet. Every time the packet crosses a router or similar device or is held in a queue for 30 seconds, the TTL field is decremented. If the TTL reaches zero before the packet reaches its ultimate destination the packet is discarded wherever it is when the TTL reaches zero. Placing a low initial value within the TTL of the packet limits the range to which it can travel.

Multicast Address Allocation

Currently there are very few permanently allocated multicast addresses. Multicast applications are quite free to choose nearly any multicast address for their use. There is a danger of address collision with other applications, so applications must be designed to detect and handle erroneous packets from other applications using the same multicast address. There are methods currently being researched to prevent this problem by providing dynamic multicast address allocation. The current research has defined a three level allocation hierarchy. Within an Allocation Domain, the lower level multicast applications running on hosts use a Multicast Dynamic Host Control Protocol (MDHCP) (based on the Dynamic Host Control Protocol) to request multicast addresses from the next level Multicast Address Allocation Servers (MAAS). An Allocation Domain normally coincides with the boundaries of the Autonomous System in which it is located. The MAAS's claim multicast addresses allocated through the use of the multicast Address Allocation Protocol (AAP). Certain nodes within the Autonomous System, usually routers, use the Multicast Address Set Claim (MASC) protocol to claim multicast address sets which they allocate to the MAAS's through the AAP. This architecture is experimental and no devices are known that currently support this architecture.

Router Interfaces

Routers are complex devices designed to efficiently receive and transmit data packets across multiple physical communication channels. These channels can include Ethernet, token ring, serial lines, ATM links, or Frame relay, all with varying characteristics and set up requirements. These channels are normally physically connected to the routers on what are called interfaces. The routers run various protocols that determine how they will receive, process, and transmit packets. These protocols can include the unicast routing protocols such as RIP or OSPF, and the multicast protocols such as DVMRP or MOSPF. Normally routers communicate between each other to exchange status and routing information in order to optimize delivery of packets. This data exchange can include advertising routes the router is aware of to reach an end destination.

Router Limitations

There are some physical implementation limitations in routers depending on the manufacturer and the model. For example in the Cisco 3600 series of routers, there is a maximum of 7000 entries allowed by default in the multicast routing table. Configuring the router can change this parameter.

Thus, in the Internet Protocol network, having a publicly available communications address is problematic as undesirable third parties may launch an attack, overwhelming the particular address or monitor the address for information not intended for the third party.

Transmitting IP packets to an IP address is somewhat akin to transmitting a signal at a particular frequency. A third party to the communication can monitor the frequency to eavesdrop on the communication or attempt to overwhelm or jam the frequency with a jamming signal. In the radio communications field, a technique known as spread spectrum communications employs a frequency hopping system where a transmitting station transmits bursts of data sequentially on a prearranged set of channels in a predetermined random pattern at specific times. The receiving station listens to the appropriate channels at the appropriate time in order to receive the communications. Frequencies can be shared among many users, as there can be many groups all hopping around in the frequency channels in a coordinated fashion. Spread spectrum techniques permit secure communications, reducing information gathering and denial of communications abilities. However such techniques require coordinated efforts between transmitting and receiving parties.

Thus, it is desirable for end stations to be able to communicate in an IP network having the limitations described herein, particularly where the address for communication is publicly known, having a method or system to alleviate most or all of the effects of certain types of Denial of Service attacks or information gathering.

SUMMARY OF THE INVENTION

The present invention provides a method and system for Internet Protocol network communications and a use thereof for protecting Internet sites against denial of service attacks on insecure public networks such as the Internet. The present invention provides a method for communicating multicast packets between end stations, in a multicast IP network, on a chosen multicast IP address from a plurality of multicast IP addresses for multicast communication using a multicast address hopping technique. The technique selectively varies the chosen multicast IP address from the plurality of multicast IP addresses according to a predetermined scheme known to the end stations but not to unauthorized endstations. The packets are then communicated on the chosen multicast IP address. Further, the packets may be communicated to an end station having subscribed to a set of multicast IP addresses comprising at least one multicast IP address from the plurality of multicast IP addresses for multicast communication and including the chosen multicast IP address for transmitting the packets. The set of multicast IP addresses may also be selectively varied according to a secret predetermined scheme known to the end stations, particularly by randomly adding to and dropping from the set of multicast IP addresses.

The technique prevents unauthorized personnel from knowing which address to disrupt or monitor for traffic between the end stations. Even if the unauthorized personnel can discover a particular multicast address chosen, addresses are dropped and new ones generated in a random fashion thus limiting the time in which the attacker can monitor packets or direct packets against an end station. Multiple sets of communicating groups all utilizing the same address space can coexist such that their respective traffic is intermingled on the various addresses, making traffic analysis very difficult.

In as aspect of the invention, the communication method may be used for communications between a plurality of end stations to reduce or eliminate the impacts of certain denial of service attacks against a site to be protected. An end station communicating via the multicast address hopping technique can decoy unicast data intended for a host site for transmitting to another end station by multicast packets. The other end station can receive the multicast packets and communicate the unicast data to the protected site. The unicast data received can be filtered and the rate of communicating of multicast packets limited to lessen the consumption of the protected site's resources. Preferably, the end stations for transmitting multicast packets are located within a single autonomous system of the network, particularly adjacent to border routers within the single autonomous system of the network.

Most of the impacts of a denial of service attack against a protected site may be alleviated while still allowing the site to continue to provide service to most of its users in a normal fashion. Use of the Anti-Denial of Service system can be transparent to the site's users and to the actual server or servers actually communicating with the users over the Internet.

In a further aspect of the present invention, there is also provided a method and system to aid in identifying the actual physical source of the attack packets by employing a triangulation process, based on varying advertised network route characteristics to change the flow of attack packets and monitoring the changes to track the origin.

BRIEF DESCRIPTION OF THE DRAWINGS

The foregoing and other features and advantages will be better understood from the following detailed description of the MAHT technique and of certain preferred embodiments of the invention with reference to the drawings, in which.

DETAILED TECHNICAL DESCRIPTION

There are four main features to MAHT technology which aid in anti DoS attacks: the multicast addressing which hides a receiving site's actual IP address, the suppression of all unicast routes to the site to be protected, the decoys which decoy DoS traffic away from actual sites, and the address hopping which prevents attackers discovering and attacking a particular multicast address. An MAHT can be implemented in various configurations to give protection against different types of threats. Configuration possibilities depend on the type of in place network infrastructure particularly the multicast routing protocol and IP packet filtering definitions.

Figure 1:
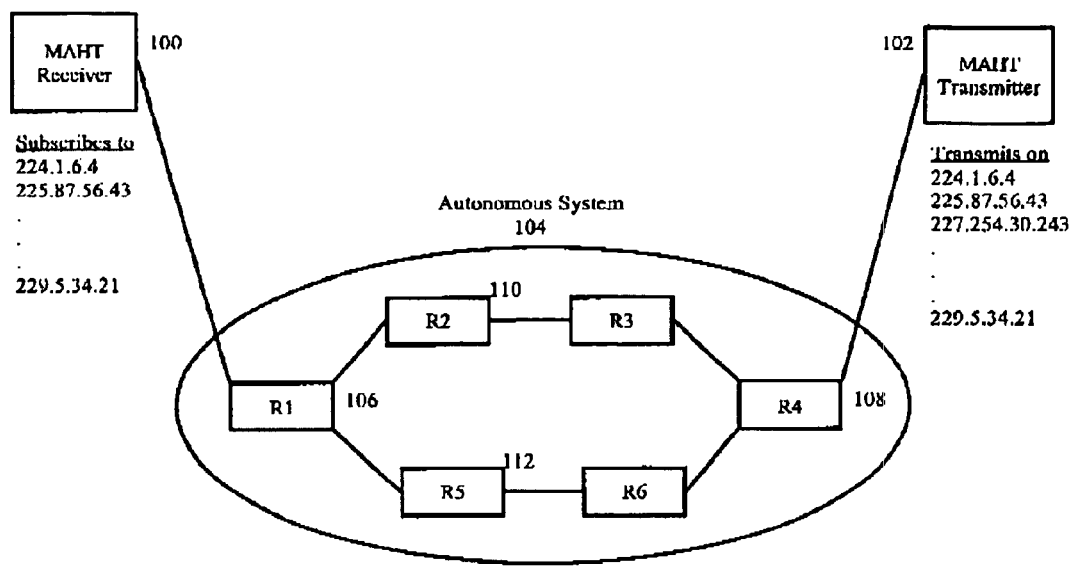
FIG. 1 is a schematic diagram showing the general architecture of a system using the multicast address hopping technique.

Referring now to the drawings and more particularly to FIG. 1., there is shown, in a schematic diagram form, the general architecture of a system that uses the MAHT to communicate within an Autonomous System of the Internet. The MAHT Receiver, Block 100, is connected to an Autonomous System, Block 104, of the Internet through Router 1, Block 106. The MAHT Transmitter, Block 102 is connected to the same Autonomous System through Router 4, Block 108. There is a plurality of routers interconnected together that form the Autonomous System router network, Block 104.

The MAHT Receiver, Block 100, subscribes to a set of multicast addresses, from the plurality of available multicast addresses in the Autonomous System, by sending the appropriate IGMP subscribe messages to Router 1, Block 106. The MAHT Transmitter, Block 102, encapsulates data in a multicast packet with an address known to be in the current set of multicast addresses to which the MAHT Receiver, Block 100, has subscribed. The data may comprise unicast IP packets destined for the MAHT Receiver, Block 100, or another site with which the Receiver is familiar (e.g. a site to be protected from a Denial of Service attack) or other data.

Router 1, Block 106 communicates with the other routers within the Autonomous System, Block 104, to request delivery of any multicast packets in the set of addresses in current use by the MAHT Receiver, Block 100. The Routers use the standard multicast routing protocol in use within the Autonomous System, Block 104, to communicate, e.g. PIM-DM, DVMRP, MOSPF, etc. In the example illustrated in FIG. 1, the MAHT Receiver, Block 100, has subscribed to a set of addresses starting with 224.1.6.4 and including 229.5.34.21. The MAHT Transmitter, Block 102, transmits the encapsulated data in multicast packets having an address selected from the same set of multicast addresses. After a time, a further address is selected for communicating with the Receiver. These multicast packets are then routed through the Autonomous System, Block 104, by the plurality of routers to be ultimately delivered to the MAHT Receiver, Block 100. If the encapsulated data comprised unicast data, the original unicast packets may then be recovered and passed on as may be necessary.

The set of addresses used by the MAHT Receiver, Block 100, and the MAHT Transmitter, Block 102, includes at least one address and preferably a larger number of addresses. The size of the set may vary depending on the capacity of the Receiver to maintain the set and the expected ability of third parties who may be monitoring the Receiver's communications. By choosing a sufficiently large number of addresses, the Receiver cloaks the particular addresses actually used for communication among those addresses to which it subscribes while lessening the chances that a person monitoring the communications can determine meaningful information about the communications.

In a preferred embodiment, addresses may be dropped from the set of addresses and new ones added to the set from the plurality of available multicast addresses in an agreed upon synchronized change scheme between the MAHT Receiver and Transmitter. Addresses for the set of addresses and particular address selected for a period of time for actual communication are selected in a fashion that is not known to parties not intended to be capable of receiving the data, such as by random selection according to a prescribed scheme known to the MAHT Receiver and Transmitter.

The duration of the subscription by the MAHT Receiver to any address or addresses from the set of addresses and the length of time that a particular address is selected for actual communication is preferably of random length. This random addressing scheme makes it difficult, if not impossible, for a remote attacker to determine which multicast address to attack to carry out a denial of service attack on the MAHT Receiver or which address to monitor for information gathering purposes as data may be spread over multiple addresses. While in the preferred example, the Receiver subscribes to multiple addresses at any one time, it is understood that the receiver may subscribe to the selected address for communication in sufficient time prior to its use, dropping the address upon termination of its use. However, such a method does not hide the selected address among a set of potential addresses, should a third party be monitoring the subscription traffic from the Receiver.

Preferably, when the MAHT is used for anti Denial of Service of a unicast-based service supplied from an end station (as described more fully below), Router 1, Block 106, (and any router adjacent to a MAHT receiver, Block 100, or transmitter Block 102) is configurable such that it does not advertise an IP route to itself nor to any downstream connected devices. This means that even though there is a physical communication link between itself and neighboring upstream router, Router 2, Block 110, or Router 5, Block 112, the upstream router is not aware of the address of the downstream router. However, the downstream router can still pass IP packets addressed to remote network hosts through the physical communication link to the upstream router that forwards them on to the remote hosts. This in effect leaves a one-way unicast route from the downstream router, e.g. Router 1, Block 106, and any connected downstream hosts, e.g. the MAHT Receiver, Block 100, into the Internet. No unicast packets can be delivered to the downstream router, e.g. Router 1, Block 106, or connected hosts, e.g. the MAHT Receiver, Block 100, since there are no unicast routes available to route them from the upstream router e.g. Router 2 or Router 5. This means that no attack packets can be directed against the router or protected host since no route exists to them. The ability to configure a router in this mode is a built in capability to most commercial routing equipment.

It is understood that for multicast protocol within the IP network, routers, e.g. Router 1, Block 106, permit multicast subscribe or de-subscribe (IGMP) packets to be passed from the downstream router, Router 1 to the upstream router through the physical communication link connected to the applicable interface. The upstream router e.g. Router 2 or Router 5, receives these IGMP subscribe or de-subscribe messages on the interface corresponding to the physical communication link to the downstream router, e.g. Router 1. This upstream router will then become aware that there is a multicast subscriber for that particular multicast address somewhere through that interface even though the router is not aware of the addresses of any hosts or subnets reachable through that interface. The upstream router, e.g. Router 2 or Router 5, then processes a request through to the other routers within the Autonomous System to receive any packets destined for that multicast address. When the router receives these multicast packets from senders elsewhere within the Autonomous System, Block 104, e.g. the MAHT Transmitter, Block 102, it will forward these multicast packets through the interface to the downstream router, e.g. Router 1, Block 106. In this example, Router 1, Block 106, will then pass these multicast packets on to the MAHT Receiver, Block 100. The ability to configure a router in this mode is a built-in capability to most commercial routing equipment.

Figure 2:
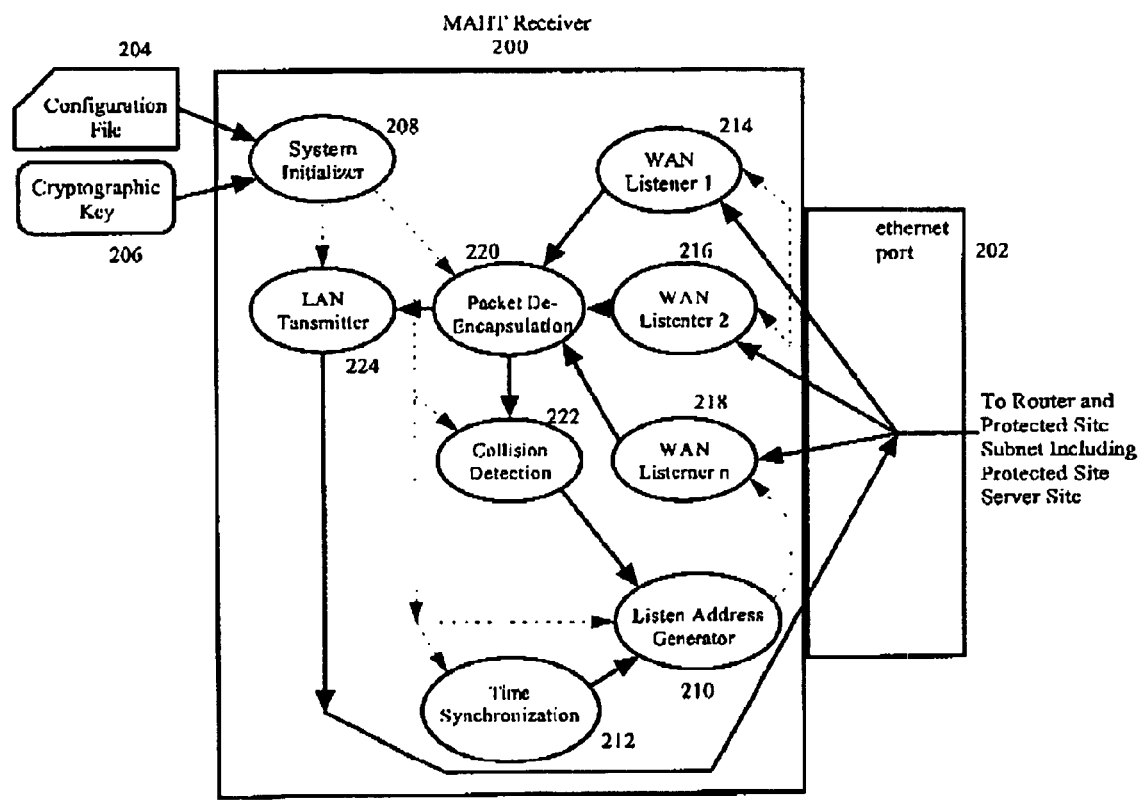
FIG. 2 is a schematic diagram showing the general conceptual architecture of an MAHT receiving device implementing a multicast address hopping technique.

Referring now to FIG. 2, there is shown a representative schematic diagram of a general conceptual architecture for a MAHT Receiver implementing the multi address hopping technique for receiving data from a MAHT Transmitter. The MAHT Receiver, Block 200, could be built as a specialized device or run as a software program on a general-purpose computer.

The MAHT Receiver, Block 200, includes a multicast address generating function comprising means to selectively vary the choice of multicast addresses on which to receive multicast data from the plurality of available multicast addresses for communicating with another end station. The Receiver further comprises means to synchronize with the Transmitter for coordinated communication on the selected multicast addresses. In the preferred embodiment, the means to selectively vary the choice of addresses comprises means to generate addresses according to a secret predetermined scheme known to the Receiver and a Transmitter, which means may be initiated by a cryptographic key. The predetermined scheme is secret in that it may be known by the Receiver, Transmitter and other selected end stations but not by another who may wish to monitor or disrupt the traffic of the selected end stations.

The MAHT Receiver, Block 200, may be connected into the IP based public network (e.g. Internet) through one or more interfaces such as an Ethernet port shown at Block 202. Configuration File, Block 204, and a current Cryptographic Key, Block 206, contain the necessary information to initialize and start the MAHT. The Configuration File may include such things as number of active Wide Area Network, (WAN), multicast ports to open, cryptographic algorithms to use, and logging settings. The System Initializer process, Block 208, reads in the Configuration File, Block 204, and the current Cryptographic Key, Block 206, and then creates the other processes with the appropriate parameters.

Listen Address Generator, Block 210, generates the appropriate multicast addresses to listen to in accordance with the predetermined scheme and any configuration parameters. These parameters include the current time, number of addresses to open, and current cryptographic key. The Time Synchronization process, Block 212 provides the current time to the Listen Address Generator, Block 210, so that the addresses are subscribed to and dropped in synchronization with the remote MAHT Transmitter. The time synchronization could be based on the system clock, an externally supplied more accurate time standard, e.g. from a Global Positioning Satellite receiver, a network time standard such as the Network Time Protocol (NTP), or a time synchronization method with the MAHT process potentially based on the NTP technique for synchronizing time across an IP network.

The WAN Listener processes, (Block 214 through 218), are created by the Listener Address Generator, Block 210. The number of WAN Listener processes created is determined by the configuration file parameters, Block 204. Each of these WAN Listener processes will listen to a different multicast address by subscribing to the upstream router using an IGMP subscribe packet sent through the Ethernet port, Block 202. Each WAN Listener process will drop their current address and subscribe to a new one in accordance with the control signals from the Listen Address Generator, Block 210. Each WAN Listener, Block 214 through 218 passes any received multicast packets to the Packet De-encapsulator, Block 220.

The Packet De-encapsulator takes the data, for example a unicast packet, from the multicast packet and performs any checks or processing on the packet including decryption and authentication if so configured. Packets are checked to ensure that they actually originated with the appropriate MAHT Transmitter. If they are actually from another multicast transmitter using the same address, these packets are discarded. If the multicast packet is from the appropriate MAHT Transmitter and the data is a unicast packet intended for a host site familiar to the MAHT Receiver, Block 200, the Packet De-encapsulator, Block 220, may pass the de-encapsulated unicast packet on to the LAN Transmitter, Block 224, to send the packet out through the Ethernet Port, Block 202, in its original unicast format, to be delivered to the unicast destination host.

Optionally, in the preferred embodiment, the processing of packets in the Packet De-encapsulator is monitored by the Collision Detection process, Block 222. This process determines if there are too many packets arriving on a multicast address that are actually from another multicast transmitter using the same address, in effect an address collision. If there is too much traffic on this address then the Collision Detection process, Block 222, can instruct the Listen Address Generator, Block 210, to drop this particular address and add a new one before the normal scheduled address drop time. The remote MAHT Transmitter can be notified that this particular address has been dropped via a control packet sent from the MATH Receiver, Block 200, to the MAHT Transmitter.

Figure 3:
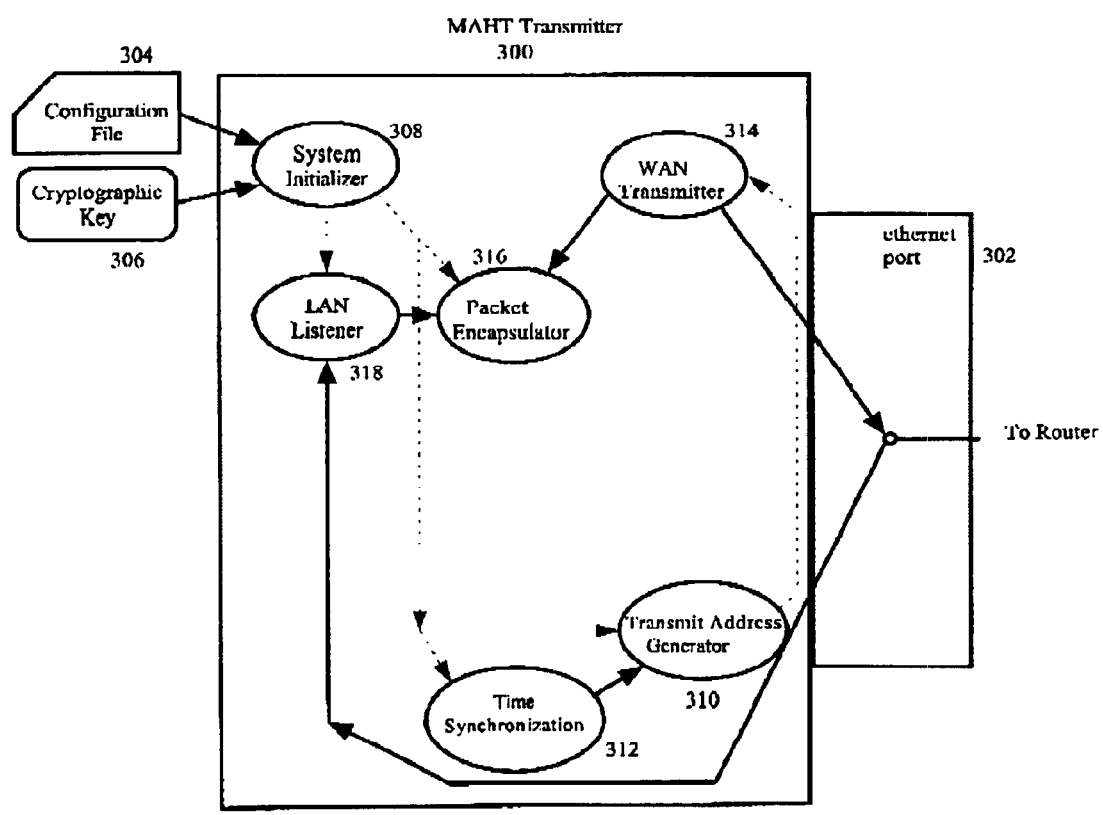
FIG. 3 is a schematic diagram showing the general conceptual architecture of an MAHT transmitting device implementing a multicast address hopping technique.

Referring now to FIG. 3, there is shown a representative schematic diagram of a preferred architecture for a MAHT Transmitter, Block 300, implementing the multicast address hopping technique for transmitting data to a MAHT Receiver. The MAHT Transmitter, Block 300, could be built as a specialized device or run as a software program on a general purpose computer.

The MAHT Transmitter, Block 300, includes a multicast address generating function comprising means to selectively vary the choice of multicast addresses on which to transmit multicast data from the plurality of available multicast address for communicating with another end station. The MAHT Transmitter, Block 300, further comprises means to synchronize with the MAHT Receiver for coordinated communication on the selected multicast addresses. In the preferred embodiment, the means to selectively vary the choice of addresses comprises means to generate addresses according to the secret predetermined criteria known to the MAHT Receiver and the MAHT Transmitter, which means may be initiated by a cryptographic key as described herein above. The MAHT Transmitter may be connected into the Internet through one or more interfaces such as an Ethernet port shown at Block 302.

Configuration File, Block 304, and a current Cryptographic Key, Block 306, contain the necessary information to initialize and start the MAHT Transmitter, Block 300. The Configuration File includes such things as number of WAN multicast addresses to use, cryptographic algorithms to use, and logging settings. The System Initializer process, Block 308, reads in the Configuration File and the current Cryptographic Key and then creates the other processes with the appropriate parameters.

For the case where the MAHT Transmitter, Block 300, is used to forward unicast data received from another host to the MAHT Receiver or a host with which the MAHT Transmitter and Receiver are familiar, LAN Listener process, Block 318, listens for appropriate unicast packets received on the Ethernet port, Block 302. The LAN Listener process, Block 318, then passes these packets on to the Packet Encapsulator, Block 316.

The Packet Encapsulator, Block 316, takes the original unicast packet from the LAN Listener process, Block 318, and performs processing on the packet including encryption and authentication, if so configured, to build a multicast packet. In other cases, the Packet Encapsulator may encapsulate and process other data it receives from other processes (not shown). The Transmit Address Generator, Block 310, generates the appropriate multicast addresses to transmit to in accordance with the configuration parameters. These parameters include the current time, number of addresses to use, hopping order, and current cryptographic key. The Time Synchronization process, Block 312 provides the current time to the Transmit Address Generator, Block 310 in accordance with a method discussed in relation to the Receiver, so that the addresses for transmission are selected and dropped in synchronization with the MAHT Receiver.

WAN Transmitter process, Block 314, is created by the Transmit Address Generator, Block 310. The WAN Transmitter receives encapsulated packets from the Packet Encapsulator, Block 316, and transmits them to the Internet through the Ethernet port, Block 302. Optionally, The MAHT Transmitter, Block 300, can be notified that a particular multicast address has been dropped, due to address collision, via a control packet sent from the MAHT Receiver to the MAHT Transmitter.

Use of Multicast Address Hopping Technique Within Internet Infrastructure

The MAHT may work with any of the IGP multicast routing protocols within an Autonomous System. Once an EGP, such as BGMP, has been defined and implemented the present invention can operate across Autonomous Systems. It is also currently possible to use well-known IP tunneling techniques to communicate multicast packets between two autonomous systems although this is an administration intensive process.

The MAHT does not necessarily require scoping but can use either TTL, administrative, or both types of scoping methods to increase the effectiveness of the system or to meet administrative requirements.

The MAHT can work within the developmental Multicast Address Allocation architecture provided that the total number of multicast addresses available is sufficient and the allocation order can be randomized in some fashion. Until the dynamic address allocation problem is resolved and standardized the present invention can operate within an Autonomous System by defining it's own multicast addresses and ensuring detection and handling of packets from other applications using the same multicast address. If there is an address collision such that there are too many erroneous packets being delivered then that particular address can be dropped.

Physical router limitations, especially the simultaneous number of open multicast route entries, must be taken into account when planning and implementing this invention in a particular Autonomous System of the Internet. These limitations can impact the implementation configuration of the present invention. However routers typically have a default limit of several thousands of routes and can be configured for more if required. For example, the Cisco 3600 series of routers have a default limit of 7000 multicast route entries that is expected to be more than adequate for practical implementation of this invention.

The MAHT may be used in a system and method for protection against certain types of Denial of Service attacks for Internet sites using IP networks, especially the Internet, as a communications media.

Figure 4:
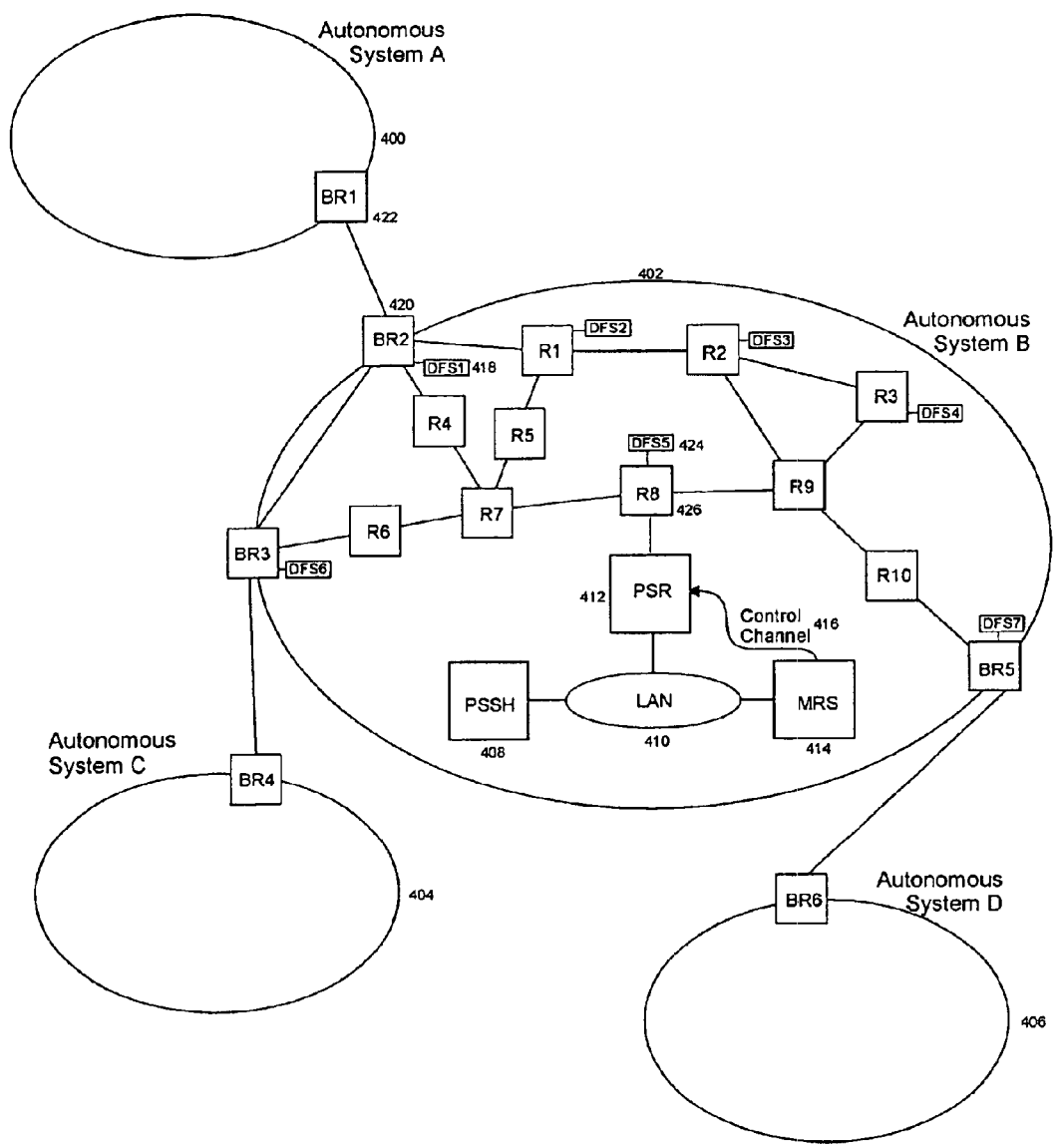
FIG. 4 is a schematic diagram showing the general architecture of a system providing protection for an Internet site against a denial of service attack.

In one embodiment the system can protect major Internet server sites from the full impacts of a coordinated Distributed Denial of Service attack. Referring now to FIG. 4, there is shown the overall architecture of one embodiment of this system. The Figure shows four Autonomous Systems, A through D at Blocks 400, 402, 404, and 406 respectively. An Autonomous System (AS) is defined as an IP network within the Internet that is under the administrative control of a single entity. These AS's can be quite large in scope for example the UUNET, the MCI-Sprint Net, etc. AS's are connected together at links between Border Routers (BR) as shown for BR1 and BR2 at Blocks 422 and 420 for the link between AS "A" and AS "B".

In this embodiment the system comprises a plurality of Decoy Forwarding Server (DFS) devices and one or more Multicast Receiver Server (MRS) devices. DFS devices are preferably connected into the Internet close to Border Routers on the perimeter of the Internet IP network within an Autonomous System as well as at key points throughout the Autonomous System, such as at a major hub for IP traffic routing, normally found at the ends of very high speed backbone communications links. Each DFS device is preferably connected into the Internet through a router ("DFS Router") into which the DFS device has an automated or manual control channel. For example DFS1 at Block 418 is connected close to the BR2, Block 420, while DFS5, Block 424, is connected to router R8, Block 426, at a key point within the AS "B", Block 402. MRS, Block 414, is connected into the Internet in close proximity (in network terms) to the Protected Site desired protection from Denial of Service attacks. In this illustration, MRS, Block 414, is connected into the same LAN, Block 410, as the Protected Site Server Host, Block 408. This server host provides the services to customers across the Internet. Both MRS, Block 414, and PSSH, Block 408, are connected into the Internet through the same router, the Protected Site Router (PSR), Block 412. MRS, Block 414, has an automated or manual control channel, Block 416, into PSR, Block 412, in order to control advertisement of routes to the protected site.

DFS and MRS devices use the multicast address hopping technique (MAHT) as an extension to the normal, well-defined IP Multicast protocols to communicate.

Figure 5:
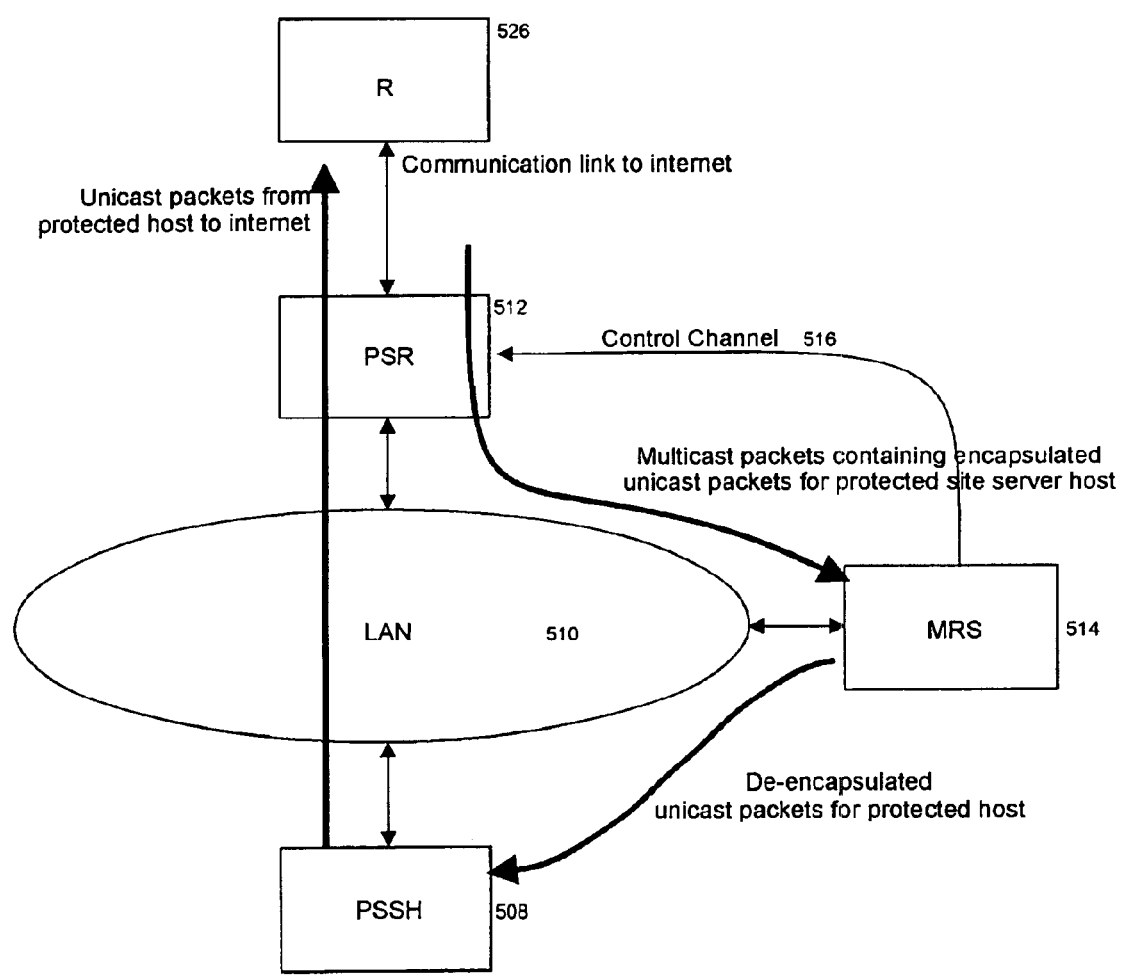
FIG. 5 is a schematic diagram showing the configuration of a major Internet site with a deployed Multicast Receiver Server (MRS)

Referring now to FIG. 5, there is shown a preferred architecture of a Protected Site consisting of an MRS, Block 514, a PSR, Block 512, a LAN, Block 510, a Router, Block 526, and a PSSH, Block 508. In this embodiment, a dynamic system configuration is used where the downstream router, PSR, Block 512, normally does advertise a route to itself to the upstream router, Router Block 526. PSR is the router standing between the Internet and the protected site including PSSH providing major Internet based services to customers. Thus, under normal circumstances, any packets addressed to PSSH, Block 508, arrive at PSR, Block 512, and are passed on to the protected host. If PSSH comes under a Denial of Service attack of sufficient intensity, then PSR can be instructed through the Control Channel, Block 516, to cease advertising a route to itself and PSSH thereby isolating the PSSH from receiving any unicast packets. During a Denial of Service attack, it is preferable to moderate the arrival rate of unicast packets to the protected host, filtering offending packets so that it can continue to provide service to legitimate clients.

The MRS and PSSH are illustrated as separate end stations in this preferred architecture for simplicity. However, it is understood that the MRS and PSSH may be integrated in a single end station.

Figure 6:
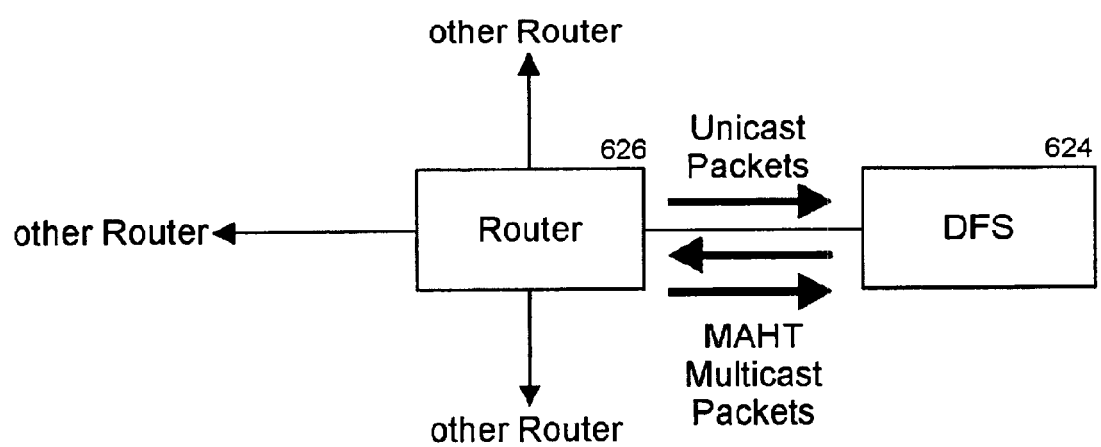
FIG. 6 a schematic diagram showing the configuration of a deployed Decoy Forwarding Server (DFS)

Referring now to FIG. 6, there is shown the architecture of a DFS site. DFS Block 624, is connected to the Router, Block 626, through one of the normal router interfaces. Normally DFS is only receiving MAHT multicast status and control messages from MRS and DFS devices. To isolate DFS from Denial of Service Attacks and monitoring, it is preferred that no routes be advertised by the DFS under normal operating conditions (i.e. absence of an attack on a protected site). DFS, Block 624, can be instructed to commence advertising to Router, Block 626, a route to PSSH, through the DFS upon the notification of an attack on PSSH. This would cause packets addressed to PSSH that arrive at Router, Block 626, to be delivered to DFS, Block 624. DFS would then use the MAHT protocol to encapsulate these unicast packets and deliver them to MRS which would then de-encapsulate them and pass them on to PSSH.

Under normal circumstances, DFS and MRS devices are in an inactive monitoring and standby mode, exchanging status and coordination messages using the multicast hopping technique. All user traffic destined for a Protected Site would use its normal (unicast) mode according to IP routing protocols. However, whenever an active denial of service attack of the packet flood or related type is detected against PSSH, DFS and MRS devices can be manually or automatically switched into the active mode. The MFS may be alerted to this situation through a server monitoring system monitoring the protected site or by manual control. The MFS may then communicate to the DFS devices through the multicast address hopping technique (MAHT) to trigger them into active operation. Use of the MAHT prevents such control communications between the DFS and MRS devices from being easily jammed. Alternately, DFS devices may be set to an active mode manually.

Referring now to both FIGS. 5 and 6, DFS devices, such as DFS, Block 624, decoy all traffic including the attack traffic to them. Preferably, they perform rate limiting and filtering before passing the surviving packets on to MRS using the MAHT protocol. The surviving or valid packets are those that pass the rate limiting and filtering processing. DFS devices encapsulate these valid packets in appropriately addressed multicast packets using the MAHT and send these multicast packets to the MRS device that is co-located with the Protected Site. It is understood that a distributed filtering and rate limiting approach by the DFS devices is preferred. However, MRS device may perform such functions for certain types of attacks, especially those not involving consumption of resources based attacks.

After detection of an attack, DFS devices send control messages to their connected routers to start advertising to the rest of the Internet that this router has an available route to the Protected Site servers through that router. The hop count or cost to the Protected Site may be set as low as possible in order to attract all possible traffic entering the AS at that Border Router or in the proximity to the DFS router. The MRS device also passes control messages to the applicable router device or devices that interface the Protected Site to the Internet, to instruct such devices to cease providing a route from the Internet to the Protected Site. Note that the MRS devices are located behind these routers on the same side as the Protected Site. Thus all traffic destined for the Protected Site is diverted to the nearest DFS through the DFS router.

Preferably, each DFS has IP arrival rate measuring and control systems in place to limit the traffic passed to the MRS device. For example, an adaptive process between the MRS and the plurality of DFS devices may be employed to allow traffic to flow to the maximum extent possible without flooding the Protected Site server. The MRS may determine which DFS devices were overloaded and therefore likely attracting the Denial of Service packets. A traffic maximum rate limit from any DFS deemed under attack may then be decreased while the traffic maximum rate limit from DFS devices not deemed under attack may be increased. This adaptive process would allow an increased number of legitimate users to continue to access the server while denying the attacker the ability to completely disrupt the service offered by the server.

The total volume of the attack traffic is distributed across the set of DFS devices thereby diluting its impact against any one site. The greater the number of DFS devices, the greater the dilution of the flood of attack packets at any one DFS device. Each DFS may also be configured to perform rate limiting on the number of packets forwarded to the MRS to prevent overloading of the protected server.

MRS, Block 514, then de-encapsulates the original unicast packets and passes them on to PSSH, Block 508. The MRS and PSSH are preferably connected for communication via a LAN or other private network. Multicast packets under the MAHT can be delivered correctly to the MRS device, Block 514, from the Internet even though no routes appear available to the MRS device, Block 514, for unicast packets. Further, outbound unicast packets from PSSH, Block 508, to users thereof can still pass through PSR, Block 512, to the Router, Block 526, and into the Internet. Thus, most users can continue to interact with the PSSH, Block 508, in a completely normal fashion with no changes to procedures, software, or hardware when the protection system is activated. If users are located along the same communication link as a main or particularly heavy source of the stream of attack packets, then such users may not be able to obtain PSSH service, especially early in the attack when the adaptive filtering process is first underway.

The adaptive filtering process is carried out in a cooperative fashion between the DFS and MRS devices. Interactive communications between the devices allow the filtering process to identify main sources of attack packet streams and to adapt the rate limits for the various DFS devices up or down depending on whether they are receiving mostly legitimate or attack packets. The adaptive process also identifies attack packets based on their supposed origin relative to the actual communication link over which they are received. The filtering process can use a Reverse Path Forwarding process whereby when any packet not received from the physical link out of which a packet destined for the packet origin address would be sent, then that packet is dropped. Such a situation would normally arise when the source address of a packet is spoofed by the attacking packet generating software. This adaptive filtering process is similar to adaptive null steering techniques used in radio frequency communications or radar systems where jamming signals from a particular direction or directions are filtered out by placing a low gain on reception of signals from that direction. DFS devices can place a null in the direction (packet communication link) of the jamming signal (attack packets) by filtering or dropping all packets on that link destined for the protected host. Note it is preferred to filter the packets to attempt to allow legitimate packets to proceed to the protected host rather than just dropping all the packets.

This decoy and filtering function provided by the system can be extended to cover additional network devices. For example, an attacker may choose to conduct a Denial of Service attack on an upstream router from the actual target Internet site. Overwhelming the upstream router would effectively block service provision by the target site. If this situation is detected then the set of DFS devices can be configured to decoy and filter traffic destined for the upstream devices. Normally there is a very low volume of traffic directly addressed for a network device, usually only control signals and status reporting information is involved. Such makes the filtering out of attack packets easier.

Additional MRS devices can be added at a given site to handle higher volumes of packet traffic if one MRS is not expected to be capable of handling the total traffic for the protected host. This can be done using well known server load sharing techniques currently used on busy Internet sites where multiple servers are used to provide the same services in a transparent fashion to users.

The group of DFS devices can be used to protect multiple sites by communicating with the respective MRS devices protecting each individual commercial site. Each protected site would not have to set up it's own set of DFS devices. The set of DFS devices could be triggered by different MRS devices located at various protected Internet sites. The number and capacity of the DFS devices is preferably sized to meet the number of protected sites and the possible number of concurrent Denial of Service attacks against different sites.

The adaptive filtering process can also be extended to provide an attacker location and isolation capability. The set of DFS devices can exchange information on such things as traffic volume and received packet characteristics including addresses, sizes, and sequence numbers. This information can be correlated to the information received directly by the MRS to better distinguish legitimate packets from attack packets. For example if two DFS devices are receiving high volumes of similar packets from the same source address even though they are located far apart in network terms then those packets are likely spoofed attack packets and can be filtered out.

Once a particular stream of attack packets has been identified, a location process can be carried out using a "triangulation" methodology whereby the DFS devices change the characteristics of the route they advertise into the Internet. By varying the characteristics of the route then an identified stream of attack packets can be made to arrive at different DFS devices depending on its origin. Analysis of the DFS devices at which the attack packets arrive in relation to the advertised characteristics of the routes provides information as to the physical originating site for the attack packets. The accuracy of this process may vary with the number of the DFS devices placed throughout the Autonomous System.

Figure 7:
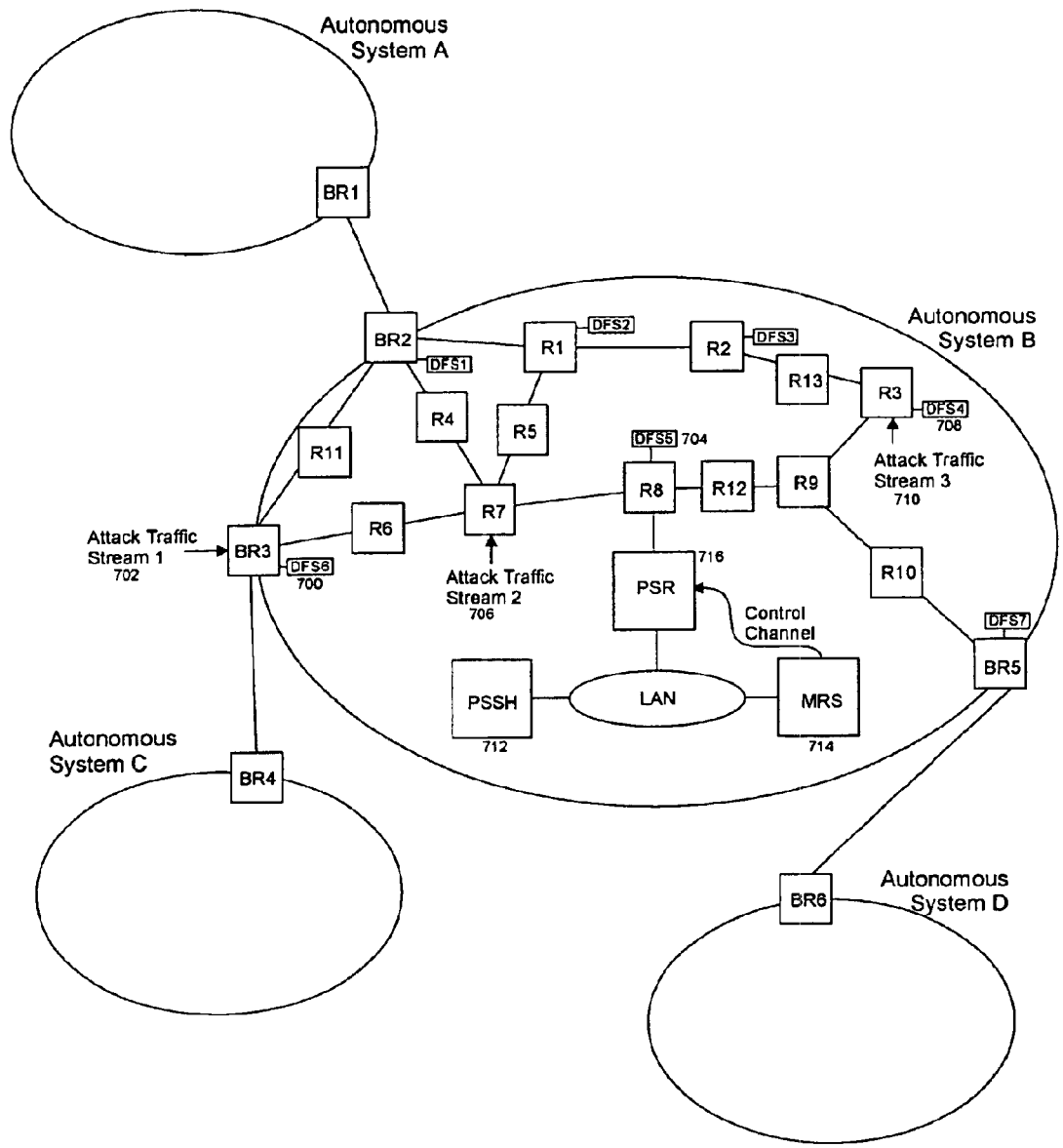
FIG. 7 is a schematic diagram showing the first stage of the attack packet source identification process using a triangulation method.

Referring now to FIG. 7, there is shown the architecture of an embodiment of the invention implementing a plurality of DFS servers in active operation, in the first stage of the attack packet source identification process using a triangulation method, by decoying jamming traffic away from a PSSH, Block 712. The DFS devices, DFS6, Block 700, DFS5, Block 704, and DFS4, Block 708 are in active operation decoying jamming Attack Traffic Stream 1, Block 702, Attack Traffic Stream 2, Block 706, and Attack Traffic Stream 3, Block 710, to each DFS respectively. Note that the sources of the attack streams are not known. These streams arrive into a router either from an adjacent router or from an attached subnet. The routers are not aware that the packets they are forwarding are part of attack traffic streams as the packets appear to be normal, and routed according to routing tables.

The DFS devices use the MAHT protocol to encapsulate filtered unicast packets in multicast packets and forward them to the MRS, Block 714, where they are de-encapsulated and passed to the PSSH, Block 712. To lessen unicast traffic to the PSSH, PSR, Block 716, ceases to advertise any route into the PSSH in response to a control instruction preferably received from the MRS. The DFS devices gather characteristic information on the attack traffic streams to use in locating the sources.

Figure 8:
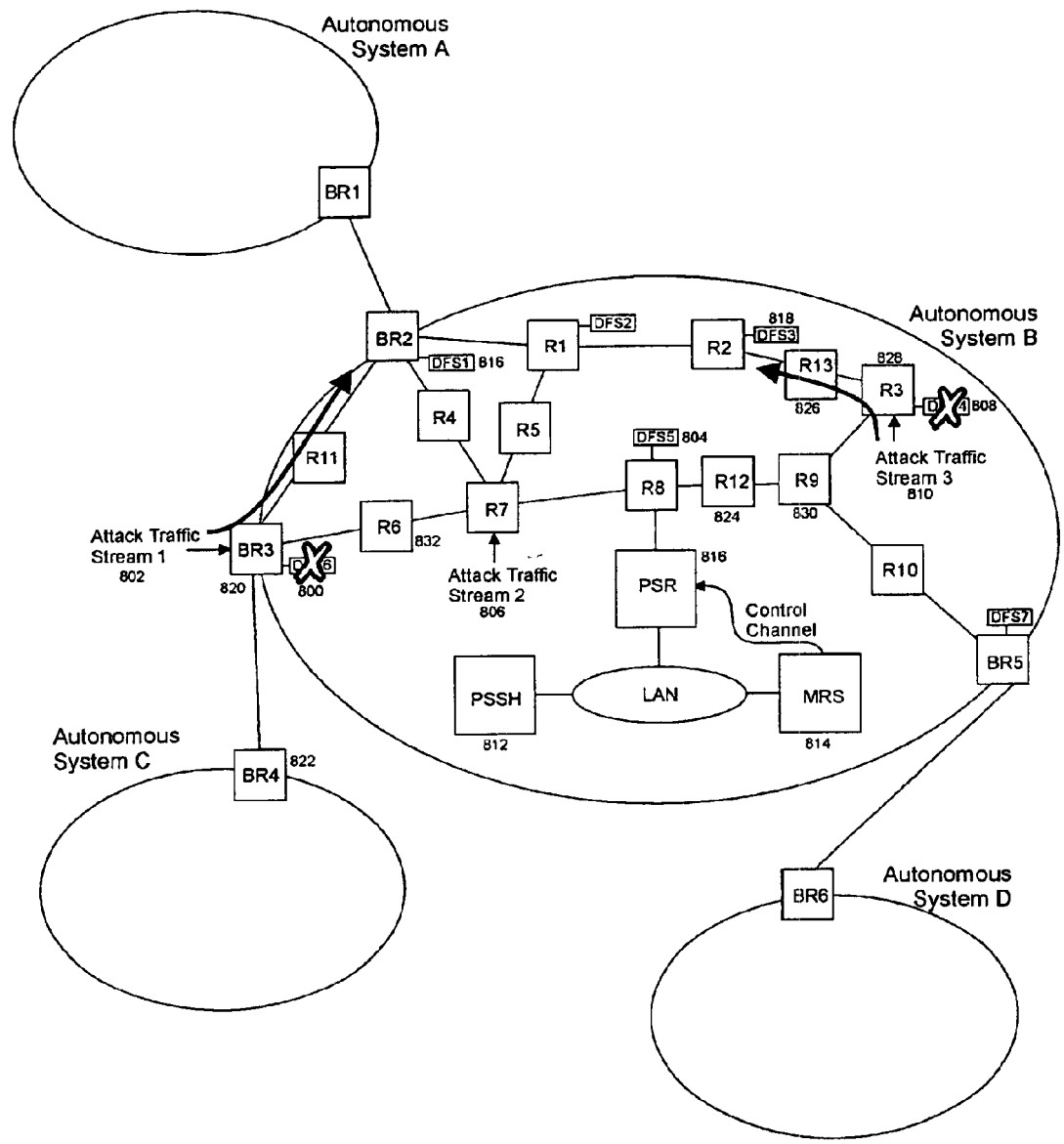
FIG. 8 is a schematic diagram showing the second stage of the attack packet source identification process using a triangulation method.

Referring now to FIG. 8, there is shown the same system as FIG. 7 with a change in the DFS configuration to show the second stage of the attack packet source identification method. DFS6, Block 800 and DFS4, Block 808, have been instructed to cease their respective decoy operations. Therefore Attack Traffic Stream 1, Block 802, will now be diverted to the next closest DFS, that is, DFS1, Block 816. Similarly Attack Stream 3, Block 810, will arrive at DFS3, Block 818. Analysis of where attack traffic streams are diverted to can provide clues to the source of the jamming traffic.

For example in this case, if Attack Traffic Stream 1 starts to arrive at DFS1, block 816, after DFS6, Block 800, is turned off, then it can be surmised that the attack stream is coming into BR3, Block 820, either from a subnet of from BR4, Block 822. The attack traffic is not coming into Router 6 Block 832, since it would have diverted to DFS5, Block 804. Similarly, if Attack Stream 3, Block 810, starts to arrive at DFS3, Block 818, when DFS4, Block 808, is turned off, then it can be surmised that the attack stream is coming into Router 3, Block 828. If the Attack Stream 3 had been arriving at Router 9, Block 830, from an attached subnet, then the attack traffic would have diverted to DFS5, Block 804.

The DFS devices can exchange information on the attack traffic characteristics in order to identify the different attack streams. By varying the shutdown or route advertisements by the plurality of DFS devices then the sources of attack streams can be narrowed down via a triangulation method similar to that used to identify location of jammers in the radio or radar field of technology. Note that the DFS devices do not actually have to be shut down. They can be instructed to advertise routes to the PSSH of a higher cost that would allow even a finer detail analysis of attack traffic stream source analysis.

Once the attack has been terminated or has dropped to a level that is acceptable by the normal PSSH the MRS Block 814, could direct the PSR, Block 816, connected between the Internet and the protected server site to start advertising the direct route again. The MRS could then direct the DFS devices to cease active operation by directing their applicable routers to cease advertising a route to the protected server. The MRS and the DFS devices would then revert back to the monitoring mode.

Encryption technology is well known and available to provide confidentiality, authentication, and integrity of data transmitted over the Internet. Confidentiality is defined as ensuring only the authorized parties can read the communications. Authentication is defined as ensuring that the communication was actually originated by the party it was purportedly sent by. Integrity is defined as ensuring that the data has not been changed by anyone during the communication process. Control communications between the MRS and DFS devices may advantageously be encrypted. Under normal circumstances there would be no need for any encryption to be used on the actual MAHT packets delivering the encapsulated packets to the MRS device from the DFS devices. Greater security could be provided by adding encryption measures to these packets using techniques well-known to those skilled in the art.

5. Existing Prototype System

Figure 9:
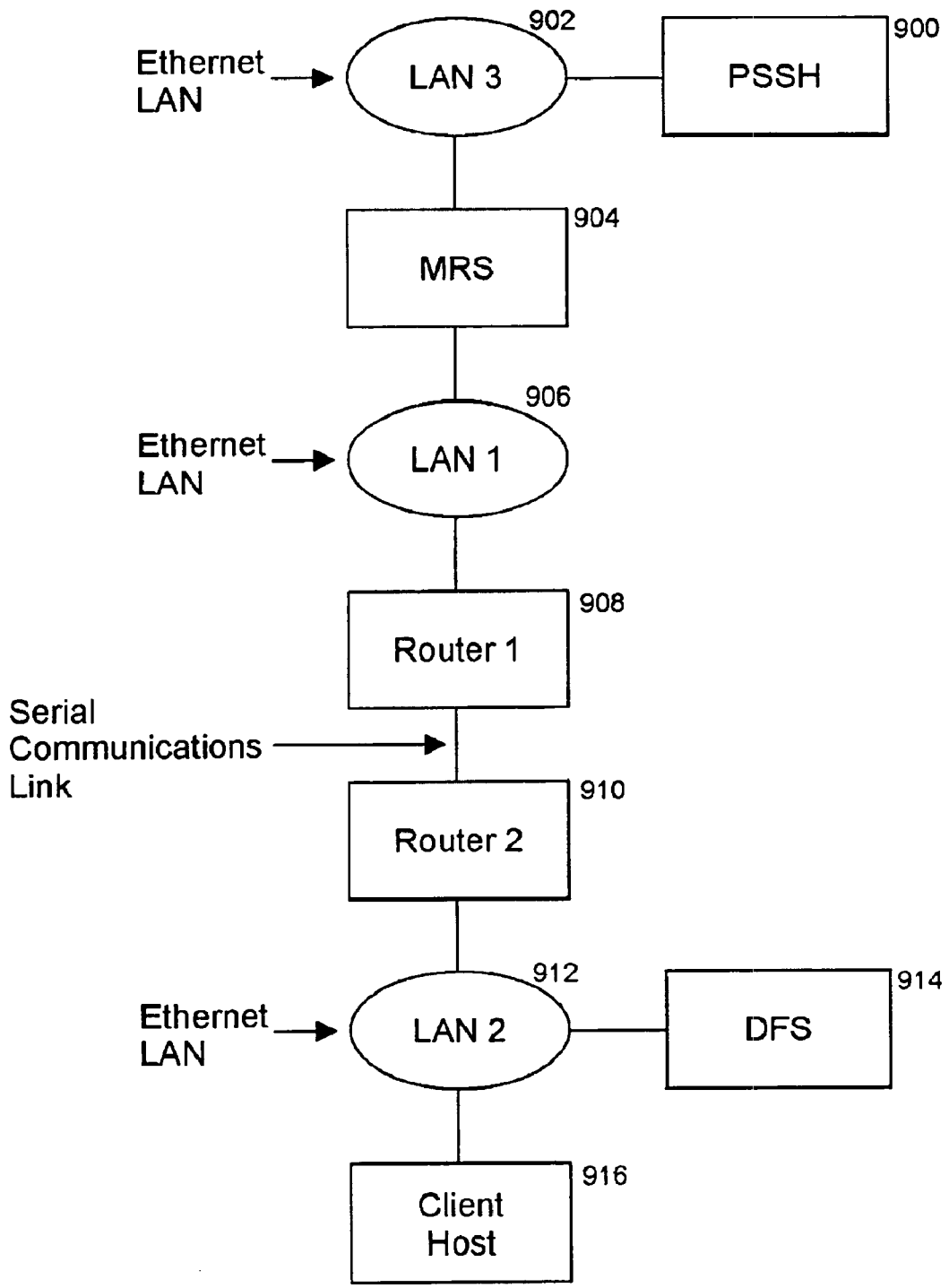
FIG. 9 is a schematic diagram showing an overview of the existing prototype test bed.

The MAHT of the subject invention has been partially prototyped and tested using a three router laboratory test bed. Referring now to FIG. 9, there is shown the set up for the existing prototype test bed. The test bed comprised two Cisco™ 3620 model routers, Router 1, Block 908, and Router 2, Block 910, directly connected together using DCE and DTE V.35 cables. These directly connected cables simulated a long distance high-speed serial communications link. Each of these Cisco Routers was connected in turn through one of their Ethernet ports to a Local Area Network (LAN), LAN 1, Block 906, for Router 1, and LAN 2, Block 912, for Router 2. There was an Intel™ based Linux™ computer, Block 904, running custom software developed for the MRS functionality located on LAN 1.

This MRS computer had a second Ethernet card that connected to LAN 3, Block 902, and was configured to route IP packets between the LAN 1, and LAN 3. There was a Linux computer used as a Protected Server Site Host, Block 900, which was also connected into LAN 3, Block 902. This PSSH Linux workstation was configured to run an ftp server, an http server, a telnet server, and an email server. On LAN 2, Block 912, there were two computers connected, a Linux based workstation, Block 914, and a Windows™ 95 based workstation, Block 916. The Linux based workstation, Block 914, was running custom software to provide DFS functionality. The Windows computer, Block 916, was running a Netscape™ and Microsoft Internet Explorer™ web browser software as well as standard Windows ftp, ping, and telnet client software.

Router 1, Block 908 was configured to block all packets destined for the PSSH, Block 900, that arrived on the serial interface from Router 2, Block 910. However, the Routers were configured using the Protocol Independent Multicast—Dense Mode (PIM-DM) routing protocol to allow multicast packets to travel from the rest of the network to LAN 1, block 906 and LAN2, Block 912. Thus there was a multicast route available between LAN 1 and LAN 2 but no unicast traffic was allowed to flow from the Client Host, block 916 to the PSSH, Block 900.

The system was tested using ftp, ping, web browsing, and ping between the PSSH and Client Host. When the DFS software, Block 914, and MRS software, Block 904 were turned off there was no connectivity between the Client Host and the MRS. When the DFS and MRS were turned on thereby initiating the MAHT protocol, then normal communications occurred between the Client Host and the PSSH using ftp, telnet, ping, and web browsing. The DFS, Block 914, picked up packets destined for the PSSH, Block 900, using packet sniffing software, encapsulated them in multicast packets, and sent them back to Router 2, block 910. This router forwarded the packets out its serial interface 0/1 to Router 1, Block 908, since Router 1 had been receiving IGMP subscribe messages for each of the 20 multicast addresses. These packets were delivered to the MRS, Block 904, where the original unicast packets were de-encapsulated and passed to the PSSH, Block 900, through the second Ethernet interface onto LAN 3, Block 902. Normal unicast packets from the PSSH, Block 900, destined for the Client Host, Block 916, could still pass normally from the PSSH through the network to the Client Host. This allowed a full bi-directional flow of data between the PSSH, Block 900 running various services and the Client Host, Block 916, in a completely transparent manner. The system achieved a rate of over 80 kilo bits per second even while using 446 bit encryption on each packet.

The multicast address hopping software was implemented primarily in the Java™ programming language with several low level Ethernet packet interface routines implemented in the C language. The software was configured to hop within a set of 20 multicast addresses in a fixed pattern and did not drop or add new addresses.

Although the present invention has been described with respect to certain preferred embodiments thereof, various changes and modifications may be suggested to one skilled in the art and it is intended that the present invention encompass such changes and modifications as fall within the scope of the appended claims.

What is claimed is:

1. In a multicast capable Internet Protocol (IP) network comprising a plurality of interconnected routers, wherein specified ones of said plurality of interconnected routers each communicate with a decoy forwarding server (DFS) and a protected site router (PSR), and wherein said PSR is connected via a local are network (LAN) to a multicast receiver server (MRS) and a protected site server host (PSSH), a method of protecting against a coordinated distributed denial of service attack comprising:
   (a) in standby mode, delivering unicast user traffic to said PSSH via said PSR; and
   (b) upon detection of said distributed denial of service attack, at a selected one of said specified routers:
      (i) decoying all traffic received at said specified router to said DFS, said traffic including said unicast user traffic and unicast attack traffic;
      (ii) filtering said unicast user and attack traffic comprising identifying and discarding said unicast attack traffic;
      (iii) encapsulating said unicast user traffic using a multicast address hopping protocol and delivering said encapsulated traffic to said MRS; and
      (iv) de-encapsulating said encapsulated traffic and delivering said de-encapsulated traffic to said PSSH.

2. The method of claim 1 wherein said multicast address hopping protocol comprises: (a) varying a chosen multicast IP address selected from a plurality of multicast IP addresses according to a predetermined scheme known only to the DSF and MRS; and (b) communicating multicast packets on the chosen multicast IP address, wherein varying the chosen multicast IP address is initiated by a cryptographic key.

3. The method of claim 1 further comprising, upon detection of a denial of service attack: (a) said MRS directing said PSR to cease advertising a route to said PSSH; and (b) said MRS directing said DFS to commence advertising a route to said PSSH.

4. The method of claim 1 wherein said IP network comprises at least two autonomous systems communicating by way of a border router.

5. The method of claim 1 further comprising, in addition to said filtering, moderating the arrival rate of said unicast user traffic to said PSSH.

6. The method of claim 1 further comprising identifying the source of said unicast attack traffic utilizing a triangulation process, wherein said triangulation process comprises: (a) varying characteristics associated with said IP network to alter the flow of said unicast attack traffic; and (b) analyzing the resulting changes to determine the origin of said unicast attack traffic.

7. The method of claim 1 wherein said distributed denial of service attack occurs at an upstream router and said filtering occurs at one or more downstream decoy forwarding servers.

8. In a multicast capable Internet Protocol (IP) network, a system for protecting against a coordinated distributed denial of service attack comprising:
 (a) a plurality of interconnected routers;
 (b) a decoy forwarding server (DFS) and a protected site router (PSR) communicating with specified ones of said plurality of interconnected routers, wherein said DFS comprises a filter for identifying and discarding unicast attack traffic and a packet encapsulator for encapsulating unicast user traffic using a multicast address hopping protocol;
 (c) a multicast receiver server (MRS) and a protected site server host (PSSH) communicating with said PSR via a local area network (LAN), wherein said MRS comprises a de-encapsulator for de-encapsulating said unicast user traffic received from said DFS and delivering said de-encapsulated traffic to said PSSH, wherein, in standby mode, said specified one of said plurality of routers delivers unicast user traffic to said PSSH via said PSR, and wherein, upon detection of said distributed denial of service attack, at a selected one of said specified routers all traffic received at said specified router is decoyed to said DFS, said traffic including said unicast user traffic and said unicast attack traffic.

9. The system of claim 8 wherein said multicast address hopping protocol comprises: (a) varying a chosen multicast IP address selected from a plurality of multicast IP addresses according to a predetermined scheme known only to the DSF and MRS; and (b) communicating multicast packets on the chosen multicast IP address.

10. The system of claim 9 further comprising a configuration file and a cryptographic key integral to said DFS and MRS for initiating said varying of said chosen multicast IP address, wherein said configuration file comprises at least one cryptographic algorithm.

11. The system of claim 8 wherein said multicast capable IP network comprises at least two autonomous systems communicating by way of a border router.

12. The system of claim 8 wherein said DFS further comprises a transmit address generator for generating one or more multicast addresses according to a defined set of configuration parameters, and wherein said configuration parameters comprise an address hopping order.

13. The system of claim 8 wherein said DFS further comprises an IP arrival rate measuring and control system for limiting said unicast user traffic passed to said MRS.

14. The system of claim 8 further comprising a control channel from said MRS to said DFS wherein, upon detection of a denial of service attack: (a) said MRS directs said PSR over said control channel to cease advertising a route to said PSSH; and (b) said MRS directs said DFS over said control channel to commence advertising a route to said PSSH.

* * * * *